(12) United States Patent
Feichtmeier et al.

(10) Patent No.: US 6,350,791 B1
(45) Date of Patent: Feb. 26, 2002

(54) THERMOSETTABLE ADHESIVE

(75) Inventors: Georg Feichtmeier, Rommerskirchen (DE); Peggy S. Willett, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/582,512

(22) PCT Filed: Jun. 22, 1998

(86) PCT No.: PCT/US98/12180

§ 371 Date: Jun. 27, 2000

§ 102(e) Date: Jun. 27, 2000

(87) PCT Pub. No.: WO99/67343

PCT Pub. Date: Dec. 29, 1999

(51) Int. Cl.$^7$ ................................................ C08K 2/46
(52) U.S. Cl. ............................ 522/81; 522/79; 522/83; 522/71; 522/100; 522/102; 522/103; 522/101; 522/170; 522/181; 522/182
(58) Field of Search .............................. 522/71, 79, 81, 522/100, 102, 103, 101, 170, 181

(56) References Cited

U.S. PATENT DOCUMENTS 5,086,088 A  * 2/1992 Kitano et al. ................ 522/170
5,883,193 A  * 3/1999 Karim et al. ................. 525/113

FOREIGN PATENT DOCUMENTS

EP          0798354 A1  * 10/1997

* cited by examiner

*Primary Examiner*—James J. Seidleck
*Assistant Examiner*—Sanza L McClendon
(74) *Attorney, Agent, or Firm*—Brian E. Szymanski; Harold C. Knecht, III

(57) ABSTRACT

The invention relates to a thermosettable adhesive comprising a thermosettable polymer component, a thermoformable polymer component, an effective amount of a heat-activatable and/or photoactivatable curing system for curing the thermosettable polymer component, and from 0.5–20 wt. % with respect to the mass of the thermosettable adhesive of one or more hydroxides and/or hydroxyoxides of Al, Mg and/or Zr.

20 Claims, No Drawings

THERMOSETTABLE ADHESIVE

FIELD OF THE INVENTION

The present invention refers to a thermosettable adhesive comprising a thermosettable polymer component, a thermoformable polymer component and an effective amount of a heat-activatable and/or photoactivatable curing system for curing the thermosettable polymer component. The present invention furthermore refers to thermosettable adhesive tapes comprising at least one layer of the thermosettable adhesive with at least one exposed surface.

BACKGROUND OF THE INVENTION

A thermosettable adhesive which is the photopolymerzation product of a precursor consisting essentially of:
(a) from about 30% to about 80% by weight of a photopolymerizable monomeric or prepolymeric syrup containing an acrylic ester of a nontertiary alcohol, and a moderately polar copolymerizable monomer;
(b) from about 20% to about 60% by weight of an epoxy resin or a mixture of epoxy resins containing no photopolymerizable groups;
(c) from about 0.5% to about 10% by weight of a heat-activatable hardener for the epoxy resin;
(d) from about 0.01% to about 5% of a photoinitiator; and
(e) from 0% to about 5% of a photocrosslinking agent, is described in U.S. Pat. No. 5,086,088. Thermosettable pressure-sensitive adhesive tapes can be obtained, for example, by coating the precursor of U.S. Pat. No. 5,086,088 onto a flexible carrier web such as a silicone release liner with a subsequent exposure to UV-irradiation. The thermosettable adhesive tapes thus obtained, can be crosslinked upon exposure to temperatures of, for example, 170° C.

European Patent Application EP 0,620,259 discloses an optionally tacky thermosettable hot-melt composition and hot-melt tapes comprising, for example, a thermosettable epoxy component, a thermoplastic polyester component, a photoinitiator for cationically curing the epoxy component and optionally a hydroxyl-containing material.

Depending on their melt flow behavior, thermosettable adhesive tapes are typically mainly used for bonding or for melt-sealing applications, respectively. Thermosettable bonding adhesive tapes allow for the preparation of assemblies by sandwiching, for example, such tapes between two substrates such as, for example, glass or optionally coated metal substrates with subsequent thermosetting of the thermosettable adhesive tape. Thermosettable melt-sealing adhesive tapes are frequently used for sealing of metal seams or for providing protective and/or topographical features, for example, to primed or unprimed, optionally coated metal parts or joints to seal joints formed by such metal parts. Thermosettable melt-flowable adhesive tapes are used, for example, in the automotive industry where they are applied to metal joints in automobiles and then thermoset and painted, for example, during a subsequent painting cycle. Thermosettable melt-flowable adhesive materials are described, for example, in WO 94/21,741.

Assemblies adhered by thermoset bonding tapes and joints sealed and covered by thermoset melt-sealing tapes are often characterized by desirable mechanical properties such as high values of overlap shear strength or high impact strength. It was, however, found that the 90° peel adhesion of thermoset bonding or melt-sealing tapes, respectively, of the prior art to various surfaces and, in particular, to primed or unprimed, optionally coated metal surfaces often is too low to meet all practical requirements. It was furthermore observed that painted, cured sealer tapes obtained, for example, when applying thermosettable melt-sealing tapes of the prior art to joints formed by primed or unprimed metal parts of automobile bodies with subsequent thermosetting and painting, often tend to exhibit an insufficient durability resulting in the formation of cracks in the painting layer of the melt-sealed area and, in particular, at the edges of the thermoset melt-sealing tape.

Therefore there was a need for improving the 90° peel adhesion of thermoset bonding or melt-sealing adhesive materials without adversely affecting other properties of the thermoset or of the corresponding thermosettable, respectively, adhesive material such as, for example, the 90° peel adhesion, the tensile strength or the overlap shear strength of the corresponding thermosettable adhesive material and the overlap shear strength or the thermal expansion coefficient of the thermoset adhesive to a degree which is unacceptable for various applications. There was furthermore a need for providing a thermosettable melt-sealing adhesive material which when applied to metal seams or joints of metal parts with subsequent thermosetting and painting, forms durable sealings which, in particular, do not exhibit cracks in the paint layer or at the edges of the melt sealing layer or exhibits such cracks only to a minor, practically acceptable degree. Other needs addressed and solved by the present invention, are evident from the detailed description of the invention below.

BRIEF DESCRIPTION OF THE INVENTION

The present invention refers to a thermosettable adhesive and, in particular, to a thermosettable pressure-sensitive adhesive comprising each a thermosettable polymer component, a thermoformable polymer component, an effective amount of a heat-activatable and/or photoactivatable curing system for curing the thermosettable polymer component, and from 0.5–20 wt. % with respect to the mass of the thermosettable adhesive of one or more hydroxides and/or hydroxyoxides of Al, Mg and/or Zr. Thermosettable adhesives comprising one or more hydroxides and/or hydroxyoxides of Al are especially preferred. The present invention also refers to thermosettable adhesive tapes comprising at least one layer of a thermosettable adhesive according to the invention wherein such layer exhibits at least one exposed surface and optionally comprises a backing, and to the use of the thermosettable adhesive and the thermosettable adhesive tapes for melt sealing or bonding applications.

More specifically, the present invention refers to a thermosettable adhesive and, in particular, to a thermosettable pressure-sensitive adhesive which each are obtainable by photopolymerization of a precursor comprising (i) from about 25 to 60 wt. % of a photopolymerizable, optionally partly prepolymerized mixture comprising at least one acrylic acid ester of a non-tertiary alcohol, and at least one reinforcing, copolymerizable monomer, (ii) from about 8 to 60 wt. % of one or more epoxy resins and/or epoxy monomers or oligomers containing no photopolymerizable groups, (iii) from 0 to about 15 wt. % of one or more additional thermoformable polymers selected from the group comprising polyvinylacetate, poly(ethylene vinyl acetate), polyacetals, polyesters and/or poly(caprolactones), (iv) from about 0.1 to 10 wt. % of a heat-activatable curing system for the epoxy component (ii), (v) from about 0.005 to 3 wt. % of a photoinitiator for the acrylate component (i), and (vi) from about 0.1 to 20 wt. % of one or more hydroxides and/or hydroxyoxides of Al, Mg and/or Zr wherein all weight percentages refer to the mass of the thermosettable adhesive.

The present invention furthermore refers to a thermosettable adhesive and, in particular, to a thermosettable pressure-sensitive adhesive which are each obtainable by extrusion of a mixture comprising (i) from about 2 to 80 wt. % of one or more polyesters, (ii) from about 5 to 80 wt. % of one or more epoxy resins and/or epoxy monomers or oligomers, (iii) from 0 to 15 wt. % of one or more additional thermoformable polymers selected from the group comprising polyacrylate, polyvinylacetate, poly (ethylene vinyl acetate), polyacetals and/or poly (caprolactones), (iv) an effective amount of one or more heat-activatable and/or photoactivatable curing systems for the epoxy component (ii), v) from about 0.1 to 20 wt. % of one or more hydroxides and/or hydroxyoxides of Al, Mg and/or Zr wherein the onset temperature of the curing reaction of the epoxy component (ii) is higher than the extrusion temperature and wherein all weight percentages refer to the mass of the thermosettable adhesive layer.

DETAILED DESCRIPTION OF THE INVENTION

In this description, the term thermosettable adhesive refers to adhesives comprising a thermosettable polymer component, a thermoformable polymer component and an effective amount of heat-activatable and/or a photoactivatable curing component.

In this description, the term thermosettable refers to a polymer component exhibiting a latent crosslinkability, i.e. the thermosettable adhesive can be thermoset by exposing it to heat and/or actinic and/or e-beam radiation. The crosslink density of the thermoset adhesives according to the present invention is sufficiently high so that the thermoset adhesive cannot be melted upon heating without decomposition and/or the thermoset adhesive essentially is not deformable upon heating and application of pressure of, for example, 5 N/cm$^2$.

In this description, the term thermoformable refers to a polymer component which is essentially thermoplastic. The thermoplastic polymer component may also be crosslinked to a low or very low degree so that a precursor of the thermosettable adhesive comprising a partially polymerized precursor of the thermoformable polymer component can be coated onto a substrate with subsequent completing of the polymerization of the thermoformable polymer component, and/or so that the thermosettable adhesive or optionally a precursor of such adhesive comprising a partially polymerized precursor of the thermosettable polymer component, can be extruded without decomposition, optionally with subsequent completion of the polymerization of the thermoformable polymer component.

In this description, the term thermosettable adhesive tape refers to a sheet- or film-like structure comprising at least one thermosettable adhesive layer with at least one exposed surface and, optionally, one or more backings. Preferred are thermosettable adhesive tapes consisting of one thermosettable adhesive layer only (also referred to as adhesive layers or films), one-sided adhesive tapes comprising one thermosettable adhesive layer adhered to a backing and two-sided thermosettable adhesive tapes comprising two adhesive layers at least one of them being a thermosettable adhesive layer whereby the two adhesive layers are adhered to the opposite major surfaces of the backing. Thermosettable melt sealing tapes comprise at least one thermosettable adhesive layer the thermosettable adhesive of which exhibits a melt-flow of at least 1%, more preferably at least 3% and especially preferably at least 5% when measured according to the test method described below, and/or passes the seam sealing test described below. Thermosettable bonding tapes comprise at least one thermosettable adhesive layer the thermosettable adhesive of which exhibits a melt-flow of less than 1% and/or does not pass the seam sealing test described below.

The thermosettable polymer component of the thermosettable adhesive according to the present invention may be based on one or more epoxy compounds. Such compounds, broadly called epoxides, include monomeric and oligomeric epoxy compounds and epoxides of the polymeric type and can be aliphatic, cycloaliphatic, aromatic or heterocyclic. Monomeric and oligomeric epoxy compounds preferably have at least two or more, preferably two to four, polymerizable epoxy groups per molecule. In polymeric type epoxides or epoxy resins, there may be many pendent epoxy groups (e.g., a glycidyl methacrylate polymer could have several thousand pendent epoxy groups per average molecular weight). Oligomeric epoxides and, in particular, polymeric epoxy resins are preferred.

The molecular weight of the epoxy-containing materials may vary from low molecular weight monomeric or oligomeric materials with a molecular weight, e.g., from about 100 to polymeric resins with a molecular weight of about 50,000 or more and may vary greatly in the nature of their backbone and substituent groups. For example, the backbone may be of any type, and substituent groups thereon can be any group not having a nucleophilic group or electrophilic group (such as an active hydrogen atom) which is reactive with an oxirane ring. Illustrative of permissible substituent groups are halogens, ester groups, ethers, sulfonate groups, siloxane groups, nitro groups, amide groups, nitrile groups, phosphate groups, etc. Mixtures of various epoxy-containing compounds can be used in the epoxy component. The epoxy component perferably comprised a mixture of two or more epoxy resins in order to modify and adapt the mechanical properties of the thermoset adhesive with respect to specific requirements.

The term epoxy compounds is used herein to mean any of monomeric, dimeric, oligomeric or polmeric epoxy materials containing a plurality, i.e. at least 2, of epoxy functional groups. Types of epoxy compounds that can be used include, for example, the reaction product of bisphenol A and epichlorohydrin, the reaction product of phenol and formaldehyde (novolac resin) and epichlorohydrin, peracid epoxies, glycidyl esters, the reaction product of epichlorohydrin and p-amino phenol, the reaction product of epichlorohydrin and glyoxal tetraphenol and the like.

Suitable diglycidic ethers of bisphenol-A are available as Ciba Geigy Araldite™ 6010, as Dow Chemical DER™ 331, and as Shell Chemical Epon™ 825, 828, 826, 830, 834, 836, 1001, 1004, 1007, etc.

A polyepoxidized phenol formaldehyde novolac prepolymer is available from Dow Chemical as DEN™ 431 and 438 and from Ciba Geigy as CY-281™, and a polyepoxidized cresol formaldehyde novolac prepolymer is available from Ciba Geigy as ECN™ 1273, 1280 and 1299.

A polyglycidyl ether of polyhydric alcohol is available from Ciba Geigy, based on butane-1,4-diol, as Araldite™ RD-2; and from Shell Chemical Corporation based on glycerine, as Epon™ 812.

Suitable commercially available flexible epoxy compounds include polyglycol diepoxies, DER™ 732 and 736, from Dow Chemical Company, diglycidyl ester of linoleic dimer acid, Epon™ 871 and 872 from Shell Chemical Company, diglycidyl ester of a bisphenol in which the aromatic rings are linked by a long aliphatic chain, Lekutherm™ X-80, from Mobay Chemical Company, epoxidized synthetic rubber materials which are available from Shell Chemical Corporation and epoxidized natural rubber materials such as ENR-10, ENR-25 and ENR-50 which are available from the Rubber Research Institute of Malaysia. The ENR materials are disclosed in Encyclopedia of Polymer Science and Engineering, Wiley, N.Y. 1988, vol. 14, p. 769.

Difunctional epoxy compounds which can be used include, for example, a solid resin, N,N,N',N',-tetraglycidyl-a,A'-bis(4-aminophenyl)-p-diisopropylbenzene, HPT™ 1071 from Shell Company, solid diglycidyl ether of bisphenol-9-fluorene, HPT™1079 from Shell Chemical Company, and triglycidylether of paraaminophenol, Araldite™ 0500/0510 from Ciba-Geigy Corporation.

High functional epoxy compounds (i.e. functionality greater than 2) which can be used include, for example, a solid epoxy novolac resin, DEN™ 485 from Dow Chemical Company, a tetrafunctional solid epoxy resin, Epon™ 1031 from Shell Chemical Company, and N,N,N',N'-tetraglycidyl-4,4'-methylenebisbenzenamine, Araldite™ MY 720 from Ciba Corporation.

Useful cycloaliphatic epoxy compounds include, for example, vinylcyclohexane dioxide which is commercially available as ERL-4206 from Union Carbide Corp., 3,4-epoxycyclohexylmethyl-3,4-epoxycyclohexane carboxylate commercially available as ERL-4221 from Union Carbide Corp., 3,4-epoxy-6-methylcyclohexylmethyl-3,4-epoxy-6-methylcyclo hexane carboxylate commercially available as ERL-4201 from Union Carbide Corp., bis(3,4-epoxy-6-methylcyclohexylmethyl)adipate commercially available as ERL-4289 from Union Carbide Corp. or bis(2,3-epoxycyclopentyl)ether commercially available as ERL-0400 from Union Carbide Corp.

The thermoformable polymer component preferably comprises, for example, one or more thermoplastic polyester compounds which may be hydroxyl or carboxyl terminated and include both homopolymers and copolymers. Thermoplastic polyesters include both amorphous and semicrystalline materials. Hydroxyl terminated materials are preferred. By "amorphous" is meant a material that displays a glass transition temperature but does not display a measurable crystalline melting point by differential scanning calorimetry (DSC). Preferably the glass transition temperature is less than the decomposition temperature of any of the compounds of the heat-activatable hardener component and photoinitiator component, but without being more than about 120° C. By "semicrystalline" is meant a polyester component that displays a crystalline melting point by DSC, preferably with a maximum melting point of about 150° C.

Polyester compounds useful in the present invention comprise the reaction product of dicarboxylic acids (or their diester derivatives) and diols. The diacids (or their diester derivatives) can be saturated aliphatic acids containing from 4 to 12 carbon atoms (including unbranched, branched, or cyclic materials having 5 to 6 atoms in a ring) and/or aromatic acids containing from 8 to 15 carbon atoms. Examples of suitable aliphatic acids are succinic, glutaric, adipic, pimelic, suberic, azelaic, sebacic, 1,12 dodecanedioic, 1,4-cyclohexanedicarboxylic, 1,3-cyclopentanedicarboxylic, 2-methylsuccinic, 2-methylpentanedioic, 3-methylhexanedioic acids and the like. Suitable aromatic acids include terephthalic acid, isophthalic acid, phthalic acid, 4,4'benzophenone dicarboxylic acid, 4,4'-diphenylmethanedicarboxylic acid, 4,4'-diphenylether dicarboxylic acid, 4,4'diphenylthioether dicarboxylic acid and 4,4'-diphenylamine dicarboxylic acid. Preferably the structure between the carboxyl groups in these diacids contains only carbon and hydrogen; more preferably it is a phenylene group. Blends of any of the foregoing diacids may be used.

The diols include branched, unbranched, and cyclic aliphatic diols having from 2 to 12 carbon atoms, such as, for example, ethylene glycol, 1,3-propylene glycol, 1,2-propylene glycol, 1,4-butanediol, 1,3-butanediol, 1,5-pentanediol, 2-methyl-2,4-pentanediol, 1,6-hexanediol, 1,8-octanediol, cyclobutane-1,3-di(2-ethanol), cyclohexane-1,4-dimethanol, 1-10-decanediol, 1,12-dodecanediol, and neopentyl glycol. Long chain diols including poly (oxyalkylene) glycols in which the alkylene group contains from 2 to 9 carbon atoms (preferably 2 to 4 carbon atoms) may also be used. Blends of any of the foregoing diols may be used.

Useful, commercially available hydroxyl terminated polyester materials include various saturated, linear, semi-crystalline copolyesters available from Hüls America, Inc. such as DYNAPOL S1402, DYNAPOL S1358, DYNAPOL S1227, DYNAPOL S1229 and DYNAPOL S1401. Useful saturated, linear amorphous copolyesters available from Hüls America, Inc. include DYNAPOL S1313 and DYNAPOL S1430.

In another embodiment, the thermoformable polymer component, is preferably based on one or more polyacrylate compounds wherein the term polyacrylates includes homopolymers and copolymers. Polyacrylates can be obtained, for example, by photopolymerizing a monomeric or prepolymeric mixture of acrylic monomers containing at least one acrylic ester and at least one polar copolymerizable polar monomer as is described in U.S. Pat. No. 5,086,088. Thermoplastic polyacrylate compounds which are useful in the present invention are also described, for example, in WO 95/13,328. The acrylic esters preferably are monofunctional acrylic or methacrylic esters of a non-tertiary alcohol, preferably having from about 4 to about 14 carbon atoms in the alcohol moiety. Included in this class of esters are, for example, n-butyl acrylate, hexyl acrylate, 2-ethylhexyl acrylate, octyl acrylate, isooctyl acrylate, decyl acrylate and dodecyl acrylate. Mixtures of two or more esters may be employed. The copolymerizable polar monomers are preferably selected from the group consisting of monomers such as isobornyl acrylate, N-vinyl pyrrolidone, N-vinyl caprolactam, N-vinyl piperidine, N,N-dimethylacrylamide, and acrylonitrile. Preferred polar monomers are nitrogen-containing such as those nitrogen-containing monomers listed above. The polar monomer or monomers will generally be selected such that a homopolymer prepared from each of them will have a glass transition temperature higher than a homopolymer prepared from each of the acrylic or methacrylic ester compounds employed. Small amounts of copolymerizable acids such as acrylic acid may be included as long as they do not deleteriously affect the curing of the epoxy. The precursor of the thermoplastic acrylate component may also comprise a low amount of crosslinkable compounds such as, for example, 1,6-hexanediol diacrylate, 1,12-dodecanediol diacrylate or benzaldehyde in order to decrease the melt-flowability of the thermosettable adhesive. The concentration of the crosslinkable compounds, if available, must be chosen sufficiently low in order to allow for coatabilty of a precursor of the thermosettable adhesive comprising a partially polymerized precursor of the thermoformable polymer component. The concentration of the crosslinkable compounds preferably is less than 0.5 wt. % and more preferably less than 0.1 wt. % with respect to the mass of the thermoformable polymer component.

The compounds enumerated above which are useful in the thermoformable polymer component of the thermosettable adhesive of the present invention are to illustrate the invention without limiting it. The thermoformable polymer component may comprise and/or be based also, for example, on poly(ethylene vinyl acetate). The thermoformable polymer component may also comprise and/or be based on mixtures of the thermoformable polymers described above and/or furthermore contain from 0 to about 15 wt. % of one or more additional thermoformable and, in particular, thermoplastic polymers (including homopolymers and copolymers) selected from the group consisting of polyvinylacetate, poly(ethylene vinyl acetate), polyacetals and/or poly (caprolactones). Such thermoformable polymer additives are frequently preferred because they may improve the coatability of the precursor of the thermosettable adhesive, improve the handling properties of the thermosettable adhesive, modify the flow properties, and also affect mechanical properties such as the hardness or modulus of the thermosettable and thermoset adhesive.

The thermosettable adhesive according to the present invention furthermore comprises a heat-activatable and/or a photoactivatable curing system in an effective amount to effect crosslinking of the thermosettable component.

Heat-activatable curing systems for thermosettable polymer components comprising one or more epoxy compounds, preferably comprise one or more heat-activatable hardener compounds which can be selected, for example, from the group consisting of polycarboxylic acid anhydrides, dicyandiamide, complexes of amines, such as ethylamine and trimethylamine with boron trifluoride or boron trichloride, aromatic polyamines such as bis(p-aminophenyl)methane, and imidazoles such as 2-ethyl-4-methylimidazole and 2-phenylimidazole. Latent heat-activatable hardener compounds are preferred. The term latent means that the initiator component is essentially unreactive at room temperature but rapidly reacts to effect curing once the onset temperature of the epoxy curing reaction has been exceeded. Latency of the hardener compounds is preferably based on solvent effects and the activity of the hardener compounds can be controlled, for example, by crystallinity, solubility or encapsulation. Suitable crystalline latent hardener compounds comprise, for example, dicyandiamide and Ancamine™ A 2337 X S and A 2014 G which is commercially available from Air Products, Manchester, U.K. An example of an encapsulated latent hardener compound is HX 938 which is commercially available from Ciba Geigy Corp.

The heat-activatable curing system for thermosettable polymer components comprising one or more epoxy components, may advantageously comprise one or more accelerators in addition to the heat-activatable hardener compound or compounds in order to crosslink the thermosettable polymer component at a lower temperature and/or in a shorter time. Preferred accelerator compounds include imidazoles such as, for example, 2,4-diamino-6-(2'-methyl-imidazoyl)-ethyl-s-triazine isocyanurate, 2-phenyl-4-benzyl-5-hydoxymethylimidazole or Ni-imidazole-phthalate.

Suitable photoactivatable curing systems for thermosettable polymer components comprising one or more epoxy components include initiators effecting cationic polymerization such as metallocene salts and aromatic onium salts.

Suitable salts of organometallic complex cations (or metallocene salts) include but are not limited to, those salts having the following formula (I)

wherein $M^p$ represents a metal ion selected from the group consisting of Cr, Mo, W, Mn Re, Fe and Co with p denoting the charge of the metal ion;

$L^1$ represents 1 or 2 ligands contributing π-electrons that can be the same or different ligand selected from the group of: substituted and unsubstituted $\eta^3$-allyl, $\eta^5$-cyclopentadienyl, and $\eta^7$-cycloheptatrienyl, and $\eta^6$-aromatic compounds selected from $\eta^6$-benzene and substituted $\eta^6$-benzene compounds and compounds having 2 to 4 fused rings, each capable of contributing 3 to 8 pi-electrons to the valence shell of $M^p$;

$L^2$ represents none, or 1 to 3 ligands contributing an even number of sigma-electrons that can be the same or different ligand selected from the group of: carbon monoxide, nitrosonium, triphenyl phosphine, triphenyl stibine and derivatives of phosphorus, arsenic and antimony, with the proviso that the total electronic charge contributed to $M^p$ results in a net residual positive charge of q to the complex;

q is an integer having a value of 1 or 2, the residual charge of the complex cation;

Y is halogen-containing complex anion selected from $BF_4^-$, $AsF_6^-$, $PF_6^-$, $SbF_5OH^-$, $SbF_6^-$, and $CF_3SO_3^-$; and n is an integer having a value of 1 and 2, the number of complex anions required to neutralize the charge q on the complex cation.

Metallocene salts of formula (1) are described, for example, in U.S. Pat. Nos. 5,089,536, 5,059,701 and EP 0,109,851

Also preferred are aromatic onium salts which are disclosed, for example in U.S. Pat. Nos. 4,069,054, 4,231, 951 and 4,250,203. Such salts can be described by the formula:

wherein

A is an organic cation selected from those described in U.S. Pat. Nos. 3,708,296, 3,729,313, 3,741,769, 3,794, 576, 3,808,006, 4,026,705, 4,058,401, 4,069,055, 4,101,513, 4,216,288, 4,394,403, and 4,623,676, all incorporated herein by reference, and X is an anion where X is defined as Y in formula (I) above.

A is preferably selected from diazonium, iodonium, and sulfonium cations and more preferably from diphenyliodonium, triphenylsulfonium and phenylthiophenyl diphenylsulfonium. X preferably is selected from the group of anions consisting of $CF_3SO_3—$, $BF_4—$, $PF_6—$, $SbF_6—$, $SbF_6OH—$, $AsF_6—$, and $SbCl_6—$.

Aromatic iodonium salts and aromatic sulfonium salts are preferred. Especially preferred aromatic iodonium and aromatic sulfonium salts are described in EP 0,620,259, p. 5, In. 17 to p. 6, In. 29.

Useful commercially available cationic photoinitiators include FX-512, an aromatic sulfonium complex salt (Minnesota Mining and Manufacturing Company (3M)), UVI-6974, an aromatic sulfonium complex salt (Union Carbide Corp.), and IRGACURE 261, a metallocene complex salt (Ciba-Geigy).

If a photoactivatable curing system is used to effect crosslinking of the thermosettable polymer component, such system comprises between 0.001–5% by weight and more preferably between 0.1–2% by weight with respect to the total mass of the thermosettable adhesive. The photoactivatable curing sytem preferably comprises 1–3 and, more preferably, 1 photoinitiator compound.

If a heat-activatable curing system is used to effect crosslinking of the thermosettable adhesive, it comprises 0.1–9% by weight and more preferably 1–8% with respect to the total mass of the thermosettable adhesive of one or more, preferably 1–3 hardener compounds and,,optionally, 1–3 accelarator compounds.

The thermosettable adhesive according to the present invention furthermore contains from 0.5–20 wt. % with respect to the mass of the thermosettable adhesive of one or more hydroxides and/or hydroxyoxides of Al, Mg and/or Zr. It is essential, however, that the moisture content and/or the content of water of crystallization (i.e. of water which is not chemically bound) with respect to the mass of the hydroxides and/or hydroxyoxides of Al, Mg and/or Zr, respectively, is less than 5 wt. %, more preferably less than 3 wt. % and especially preferably less than 2 wt. %. It was found that the thermosettable adhesive tends to form bubbles and surface irregularities especially upon heat-activated thermosetting in case the moisture content and/or the content of water of crystallization exceeds 5 wt. % with respect to the mass of the hydroxides and/or hydroxyoxides of Al, Mg and/or Zr, respectively. In this description, the terms hydroxyoxides and oxidehydroxides are considered to be synonymous. Hydroxyoxides and oxidehydroxides include partially hydroxylated oxides (i.e. oxides comprising hydroxy groups), hydroxides comprising oxy groups and hydrated oxides with the proviso that the content of water of crystallization of such compounds is less than 5 wt. % with respect to the mass of such compounds.

While the moisture content and/or the content of water of crystallization of the hydroxides and/or hydroxyoxides of Al, Mg and/or Zr, respectively, preferably is low or very low, the concentration of chemically bound water in such compounds can be distinctly higher. The Al(OH)3 which is commercially available from Alcoa Industrial Chemicals, Bauxite AR, U.S.A. as SpaceRite S-11 Alumina, comprises about 35 wt. % of chemically bound water but a moisture content of only 0.6 wt. % with respect to the mass of SpaceRite S-11 Alumina.

The hydroxides and/or hydroxyoxides of Al are preferred. Suitable hydroxides and/or hydroxyoxides of Al comprise, for example, crystalline or partly crystalline Al hydroxides and hydroxyoxides such as $Al(OH)_3$, $AlO(OH)$ and $Al_2O_3 \cdot xH_2O$ of both the α- and γ-modification. Suitable hydroxides and hydroxyoxides of Mg and Zr include $Mg(OH)_2$ and $Zr(OH)_4$.

The hydroxides and/or hydroxyoxides of Al, Mg and or Zr, respectively, typically are used as fine crystalline or partially crystalline powders with an average particle size (as measured, for example, by sreeen analysis) of preferably less than 5 μm and more preferably less than 1 μm. The hydroxides and/or hydroxyoxides of Al, Mg and/or Zr are preferably homogenously dispersed in the precursor of the thermosettable adhesive.

It was found by the present inventors that the 90° peel adhesion of thermoset adhesives according to the present invention, in particular, to polar surfaces can be improved by adding an effective amount of one or more hydroxides and/or hydroxyoxides of Al, Mg and/or Zr. The term polar surfaces refers, in particular, to surfaces of metal, glass and to painted surfaces. Such surfaces, if desired, may be treated with a suitable chemical primer and/or subjected to corona treatment or similar surface treatments. For concentrations of below 0.5 wt. % with respect to the mass of the thermosettable adhesive according to the present invention, a significant increase of the 90° peel adhesion of the thermoset adhesive was frequently not observed. The concentration of the hydroxides and/or hydroxyoxides of Al, Mg and/or Zr preferably is at least 1 wt. %, more preferably at least 2 wt. % and especially preferably at least 2.5 wt. % with respect to the mass of the thermosettable adhesive. With increasing concentration of one or more hydroxides and/or hydroxyoxides of Al, Mg and/or Zr, the 90° peel adhesion of bondings and sealings employing the thermoset adhesive of the present invention, increases so that cohesive failures of such bondings and sealings typically dominate over adhesive failures. For concentrations above 20 wt. %, the thermosettable adhesive of the present invention tends to become brittle. The concentration of one or more hydroxides and/or hydroxyoxides of Al, Mg and/or Zr preferably is between 1–17.5 wt. % and, more preferably, between 2–15 wt. % with respect to the mass of the thermosettable adhesive.

Especially preferred are thermosettable adhesives according to the present invention comprising one or more hydroxides and/or hydroxyoxides of Al. It was furthermore found that thermosettable adhesives according to the present invention comprising one or more hydroxides and/or hydroxyoxides of Al, are especially preferred for melt-sealing applications. Seams and metal-joints when covered with thermoset melt-sealing tapes and, in particular, melt-sealing layers or films according to the present invention exhibit when painted an aesthetically appealing appearance and a high durability.

The thermosettable adhesive according to the present invention may additionally comprise various fillers, adjuvants, additives and the like such as silica, glass, clay, talc, pigments, colorants, glass beads or bubbles, glass, ceramic or organic fibers, antioxidants and the like so as to reduce the weight or cost of the composition, adjust viscosity, and provide additional reinforcement. Fillers and the like which are capable of absorbing the radiation used during the curing process(es) should be used in an amount that does not adversely affect the curing process. The amount of such additives may be 0–25 wt. % and more preferably 0–15 wt. % with respect to the total mass of the thermosettable pressure-sensitive adhesive.

The thermosettable adhesive of the present invention can be obtained by various methods.

In the case of acrylate/epoxy based systems it is preferred that the epoxy component and the curing system for the epoxy component are dissolved and/or dispersed, respectively, in a monomeric or partly prepolymerized precursor of the acrylate component. This mixture preferably additionally comprises one or more photoinitiator compounds and, in particular, radical photoinitiator compounds, such as 2,2-dimethoxy-1,2-diphenylethane-1-one (commercially available as Irgacure™ 651 from Ciba Geigy) to effect polymerization of the acrylate compound. If such method of preparation is applied it is often preferred to use a heat-activatable curing system for crosslinking the epoxy component which can be included into the above solution or mixture of the epoxy component with the monomeric or prepolymeric acrylate syrup without interfering with the subsequent photopolymerization of the acrylate precursor. It is, however, also possible to incorporate a photoactivatable curing system for crosslinking of the epoxy component into the mixture of the polymerized acrylate component and the epoxy component after the polymerization of the acrylate component has been effected.

The acrylate/epoxy based thermosettable adhesives can also be obtained, however, by providing the polymerized polyacrylate component and dissolving and/or dispersing the epoxy component, the curing system, the hydroxides and hydroxyoxides of Al, Mg and/or Zr and, optionally, further compounds in the molten polyacrylate component followed by extrusion of the adhesive Further details on the preparation of acrylate/epoxy based systems can be taken, for example, from U.S. Pat. No. 5,086,088, WO 95/13,328 and EP 0,798,354, which are incorporated by reference herein.

An especially preferred epoxy/acrylate based thermosettable adhesive is obtainable by photopolymerization of a precursor comprising (i) from about 25 to 60 wt. % of a photopolymerizable, optionally partly prepolymerized mixture comprising at least one acrylic acid ester of a non-tertiary alcohol, and at least one reinforcing, copolymerizable monomer, (ii) from about 8 to 60 wt. % of one or more epoxy resins and/or epoxy monomers or oligomers containing no photopolymerizable groups, (iii) from 0 to about 15 wt. % of one or more additional thermoplastic polymers selected from the group comprising polyvinylacetate, poly(ethylene vinyl acetate), polyacetals, polyesters and/or poly(caprolactones), (iv) from about 0.1 to 10 wt. % of a heat-activatable curing system for the epoxy component (ii), (v) from about 0.005 to 3 wt. % of a photoinitiator for the acrylate component (i), and (vi) from about 0.1 to 20 wt. % of one or more hydroxides and/or hydroxyoxides of Al, Mg and/or Zr wherein all weight percentages refer to the mass of the thermosettable adhesive.

The acrylate component (i) is preferably mixed with the photoinitiator component (v) for the acrylate component and is partially prepolymerized to a syrup exhibiting a coatable viscosity in the range of typically from about 100 to 10,000 cps, and more preferably from about 300 to 2,500 cps. Then the epoxy component (ii), the heat-activatable curing system (iv) and the component (vi) comprising one or more hydroxides and/or hydroxyoxides of Al, Mg and/or Zr are dissolved or dispersed, respectively, in the acrylate monomer mixture or in the partially prepolymerized acrylate syrup. The ratio of the mass of the epoxy component (ii) over the acrylate component (i) preferably is between 0.2 and 2 and more preferably between 0.4 and 1.5. The ratio of the epoxy component (ii) over the acrylate component (ii) preferably is between 0.3 and 1.2 for melt sealing applications and between 0.4 and 1.4 for bonding applications.

The epoxy compounds can be liquid, semi-liquid or solid at room temperature. It was found that the tackiness of the thermosettable adhesive can be modified and optimized with respect to specific requirements by varying the amount of liquid, semi-liquid and solid epoxy resins.

In case the resulting thermosettable adhesive is required to be non-tacky to the touch at room temperature, the ratio of solid epoxy resins is preferably chosen to be high and, in particular, is at least 80% by weight and more preferably at least 90% by weight with respect to the mass of the epoxy component (ii). Non-tacky thermosettable adhesives are useful for some melt sealing applications.

If the resulting thermosettable adhesive is to be tacky to the touch at room temperature, the epoxy component (ii) preferably comprises one or more epoxy resins which are liquid or semi-liquid at room temperature. The ratio of the mass of liquid and semi-liquid epoxy compounds to the mass of solid epoxy compounds preferably is at least 2.0 and, more preferably, at least 2.25. Tacky thermosettable adhesives are useful for melt sealing and bonding applications.

The tackiness of the thermosettable adhesive can also be modified by varying the mass ratio of acrylic acid ester(s) of non-tertiary alcohol(s) to the reinforcing, copolymerizable monomer(s) of the acrylate component (i). Increasing the amount of acrylic acid ester(s) of non-tertiary alcohol(s) with respect to the mass of the acrylate component (i) tends to increase the tackiness of the thermosettable adhesive while increasing the amount of polar copolymerizable monomer(s) tends to decrease tackiness.

The acrylate/epoxy system preferably comprises one or more hydroxides and/or hydroxyoxides of Al which are transparent for UV irradiation and do not interfere with the subsequent UV polymerization of the acrylate component (i) resulting in the thermosettable adhesive of the present invention.

It was found that the 90° peel adhesion of thermoset acrylate/epoxy systems to various surfaces and, in particular, to polar surfaces can be further increased by adding to the acrylate component (i) one or more hydroxy-substituted acrylic ester of a non-tertiary alcohol such as, for example, hydroxyphenoxypropyl(meth)acrylate, hydroxyethyl(meth) acrylate, hydroxypropyl(meth)acrylate or hydroxybutyl (meth)acrylate. The ratio of the mass of the hydroxysubstituted acrylate compounds over the mass of the hydroxides and/or hydroxyoxides of Al, Mg and Zr and, in particular, of Al preferably is between 0.02 and 1.5 and more preferably between 0.1 and 1. Although the present inventors do not wish to be bound by such theory it is speculated that the hydroxy-substituted acrylic esters of a non-tertiary alcohol act as a compatibilizing agent between the thermoformable acrylate phase and the thermosettable epoxy phase thereby increasing the surface availability of the epoxy phase.

The epoxy/acrylate based thermosettable adhesives according to the present invention may contain in addition to the acrylate component (i) from 0 to about 15 wt. % of one or more thermoformable and, in particular, thermoplastic polymers selected from the group comprising polyvinylacetate, poly(ethylene vinyl acetate), polyacetals, polyesters and/or poly(caprolactones). Polymer additives which are suitable for the epoxy/acrylate systems of the present invention are described in some detail in EP 0,798, 354, p.5, ln. 19–p.9, ln.47.

In the case of polyester/epoxy based thermosettable adhesives, a photoactivatable curing system is usually preferred for crosslinking the epoxy component over a heat-activatable curing system because the pressure-sensitive adhesive is preferably obtained by dissolving and/or dispersing the epoxy component, the curing system, the hydroxides and hydroxyoxides of Al, Mg and/or Zr and, optionally, further compounds in the molten polyester component followed by extrusion of the adhesive. Further details on the preparation of polyester/epoxy systems can be taken, for example, from EP 0,620,259 and U.S. Pat. No. 5,436, 063, incorporated by reference herein.

An especially preferred epoxy/polyester based thermosettable adhesive is obtainable by extrusion of a mixture comprising
(i) from about 2 to 80 wt. % of one or more polyesters,
(ii) from about 5 to 80 wt. % of one or more epoxy resins and/or epoxy monomers or oligomers,
(iii) from 0 to 15 wt. % of one or more additional thermoplastic polymers selected from the group comprising polyvinylacetate, poly(ethylene vinyl acetate), polyacetals and/or poly(caprolactones),
(iv) an effective amount of one or more heat-activatable and/or photoactivatable curing systems for the epoxy component (ii),
(v) from about 0.1 to 20 wt. % of one or more hydroxides and/or hydroxyoxides of Al, Mg and/or Zr wherein the onset temperature of the curing reaction of the epoxy component (ii) is higher than the extrusion temperature and wherein all weight percentages refer to the mass of the thermosettable adhesive layer.

The thermosettable adhesive tapes used in the present invention can be unsupported or supported.

Unsupported thermosettable adhesive tapes comprising no backing (often also referred to as adhesive films) can be obtained, for example, in case of acrylate/epoxy based tapes by mixing the epoxy component, the curing system, the hydroxides and/or hydroxyoxides of Al, Mg and/or Zr and, if present, further additives with the monomeric or prepolymeric acrylate syrup and coating the resulting mixture with the desired thickness onto a first release liner such as a siliconized polyester film with subsequent photopolymerization of the acrylic component. The exposed surface of the unsupported pressure-sensitive adhesive tape may then be protected by a second release liner.

Similarly, in case of polyester/epoxy based tapes the mixture comprising the molten polyester component, the epoxy component, the curing system for the epoxy component, one or more hydroxides and/or hydroxyoxides of Al, Mg and/or Zr and, if present, additional fillers, adjuvants or other additives, may be extruded with the desired thickness onto a first release liner such as a siliconized polyester film, and a second release liner is subsequently laminated onto the exposed surface of the unsupported pressure-sensitive adhesive tape.

Supported pressure-sensitive adhesive tapes comprise at least one backing. Depending on the respective application, the backing may be selected, for example, from a group of materials comprising polymeric films of various stiffness such as, for example, ethyl vinyl alcohol polymers, polyesters, polycarbonates or polymethacrylates, papers, non-wovens, laminates, one part mechanical fasteners (which are described, for example, in U.S. Pat. No. 5,077,870) or metals. The backing preferably has a paintable surface which accepts and retains paint readily, and also is stable at relatively high temperatures of, for example, 120–210° C. The heat deflection temperature of the backing as measured by ASTM D648-96, is preferably greater than 120° C. In this description the thickness of the backing typically varies between 25 µm and 3,000 µm and preferably between 25 and 1,000 µm. The backing material should be selected such that the adhesive exhibits a very strong bond to it. If desired, the bond to the backing material may be enhanced by treating the backing with chemical primers or subjecting it to corona treatment.

The thermosettable adhesive can be applied to the backing by methods identical or similar to those described above for the preparation of unsupported pressure-sensitive adhesive tapes.

Depending on their melt-flow and seam sealing behaviour the thermosettable adhesive tapes of the present invention can be used for bonding or melt-sealing applications, respectively. An example of a melt sealing application is in the automotive industry where the adhesive tapes can be utilized in a process to seal metal joints in automobiles. In this process, the thermosettable adhesive tape is applied over the joint of metal parts to be sealed and thermoset and painted, for example, during a subsequent painting cycle. An example of a bonding application is in the automotive industry where the thermosettable adhesive tape according to the invention can be used for attaching the attachment bracket of rear view mirrors to windshields.

The melt-flowability and the ability to seal seams of the thermosettable adhesive tapes can be modified and optimized with respect to a specific application by various measurements. It is, for example, typically observed that the melt-flowability and/or the sealing performance of the thermosettable adhesive tape tends to decrease with increasing mass ratio of the hydroxides and/or hydroxyoxides of Al, Mg and or Zr. The melt-flowability and/or the sealing performance can also be modified by including fillers such as, for example, silica and/or glass or organic fibers, and it is usually decreased with increasing concentration of such fillers. In epoxy/acrylate based systems the melt-flowability and/or the sealing performance of the thermosettable adhesive tapes typically tends to decrease with increasing concentration of one or more hydroxysubstituted acrylate compounds. In acrylate/epoxy based systems the melt-flowabilty and/or the sealing performance can furthermore typically be decreased by including a small amount of one or more compounds crosslinkable with the acrylate component.

Especially preferred are melt-sealing tapes according to the present invention. The degree of melt-flowability can be varied to a high degree using the techniques described above. In an especially preferred embodiment of a melt-sealing tape according to the present invention, the melt-flowability of such tape is adjusted to be lower than 2%, more preferably lower than 1% and, in particular, essentially 0% with the tape, however, still passing the seam sealing test described below. Such tapes are particularly useful for sealing non-horizontally oriented seams or joints. Upon melting, the melt-sealing tape softens and snugly adheres to the seam or joint without flowing down on the substrate. Especially preferred are melt-sealing tapes and, in particular, melt-sealing films or layers wherein the adhesive according to the invention comprises one or more hydroxides and/or hydroxyoxides of Al.

When using the transfer tape according to the invention, for example, for sealing of metal joints such as roof ditches in the automotive industry, it must exhibit a sufficient paintability. The paintability of the thermoset adhesives according to the invention is sufficient for most applications. If an improvement of the paintability is desired this can be achieved, for example, by laminating a paintable backing such as, for example, a metal film or a polymeric film onto the thermosettable adhesive, or by coating the UV-curable precursor of such adhesive onto the backing. Suitable backings include, for example, polyesters such as polyethylene terephthalate or polybutylene terephthalate, polyimides, polyurethanes, polyacrylates or polyepoxides may be used. Polybutylene terephthalate is a preferred paintable backing. The thickness of the backing is preferably between 50–00 µm and more preferably between 75 and 300 µm. Especially preferred is "POCAN 7916", which is a rubber modified polybutylene terephthalate/polycarbonate blend which is commercially available from Bayer, Leverkusen, Germany.

The following examples are intended to illustrate the invention further without limiting it. First, however, certain procedures and tests utilized in the examples, will be described.

Test Methods for the Thermosettable Adhesive

90 Degree Peel Adhesion

A 1.27 cm×15.24 cm strip of a layer or film of the thermosettable adhesive between two release layers was prepared as described in the examples and allowed to age for at least 24 h before testing. One release liner was removed and the exposed adhesive surface pressed by hand onto the dull side of a 0.13 mm thick foil of anodized aluminium which serves as a backing for the tape construction.

A steel test coupon bearing a coating of the primer ED 5100 (commercially available from Advanced Coating Technology, Hillsdale Mich., U.S.A.) was cleaned with heptane and then with methylethylketone and then allowed to dry at ambient conditions. The second release liner was removed from the adhesive layer or film, and the exposed surface of the thermosettable adhesive was adhered to the cleaned steel coupon. The sample was rolled down onto the steel test plate 4 times with a 2.0 kg roller and allowed to remain in contact with the test substrate for about 1 minute before testing.

The test construction thus obtained was then placed in a tensile tester (Instron™) so that the aluminium foil and melt sealing material were peeled away from the steel test panel at an angle of 90 degrees. The peel adhesion was measured at a speed of 30.5 cm per min and was recorded in N/1.27 cm.

The test was repeated four times and the results then averaged.

Melt flow behavior

A 1 mm thick layer or film of a thermosettable adhesive between 2 release layers was prepared as described in the examples and allowed to age for at least 24 hours before testing.

The top release liner was removed and a sample of the thermosettable adhesive layer of the dimensions 1.27 cm×1.27 cm was adhered with its exposed surface to a stainless steel test plate (6.3 cm×5 cm) which had been cleaned three times with isopropanol and three times with heptane. The remaining release liner was removed, so that a layer of the thermosettable adhesive remained on the stainless steel plate.

This construction was then placed in a vertical fashion in a forced air oven set at a temperature of 160° C. After 20 minutes, the construction was removed from the oven and allowed to cool.

The new length of the adhesive layer was measured and compared to the original length of 1.27 cm. The melt flow test was conducted twice and the results averaged and recorded in percent.

Seam Sealing Test

Two steel coupons measuring 2.54 cm×9.0 cm were primed with the primer ED 5100 referred to above. The coupons were cleaned with a mixture of 1:1 isopropanol and water and allowed to dry at ambient conditions. The two plates were clamped together on both ends using small spring clips so that the long side overlapped by about 5 mm.

A section of a layer of the thermosettable adhesive of 1.27 cm×5 cm having a thickness of 1 mm was laid across and centered on the joint between the two steel plates. The layer extended along the fill length of the seam and was pressed onto the seam with pressure from the thumb.

The sample thus prepared was placed in a vertical position in a forced air oven at a temperature of 160° C. for 20 minutes. The sample was removed from the oven and allowed to cool.

The effectiveness of the seam sealing was judged as

+Seam is sealed. No air channel was visible at the joint where the two plates overlap. Edges of the adhesive layer showed slightly rounded corners.

−Seam was not sealed. An air channel was still visible at the seam. Tape edges/corners were still sharply defined.

This test gives an indication of the ability of the thermosettable adhesive film or layer to seal an overlapping joint and to form a smooth and rounded adhesive layer over the seam.

Tensile Strength

A standard tensile strength procedure was conducted on a layer or film of the thermosettable adhesive according to ISO 1184 D 638. A layer of the thermosettable adhesive was prepared as described in the examples and allowed to age for at least 24 hours before testing.

This test gives an indication of the strength of the thermosettable adhesive layer in the state in which it is applied to the substrates to be bonded and indicates whether the tape has sufficient cohesive strength.

Test Methods for the Thermoset Adhesive

90° Peel Adhesion with Embedded Screen

A single steel plate having dimensions 12 cm×5 cm was primed with the ED 5100 primer referred to above. The plates were cleaned with heptane and then with methyl ethyl ketone and then allowed to dry at ambient conditions.

A double-coated pressure sensitive adhesive tape (Adhesive Tape 10419, commercially available from 3M Company, U.S.A.) bearing a single siliconized polyester liner was adhered to the surface at one end of the plate covering the last 2 cm of the plate. The liner was left on the adhesive tape, thus forming an area on the plate which had anti-adhesive properties.

A strip of a thermosettable adhesive layer or film 10 cm long×12.5 mm wide was applied to the face of the steel plate bearing the double-coated pressure-sensitive adhesive tape with the attached liner in a manner such that the strip of the thermosettable adhesive was centered along the long axis of the steel plate and extended over the area covered by the double-coated adhesive tape with the attached liner.

A stainless steel screen (mesh width 1 mm, wire thickness 0.3 mm, obtainable from Gebr. Kufferatlh & Co KG, Dueren, Germany) was cut to tile size of 20 cm×12.5 mm (same width and twice the length of the strip of the layer of the thermosettable adhesive). The steel identification number for the wire screen was 1.4401 (V4A). The screen was cleaned with methyl ethyl ketone to remove oily coatings and then allowed to dry at ambient conditions. The stainless screen strip was laid then over the strip of the thermosettable adhesive layer so that one end of the screen completely covered the strip of the thermosettable adhesive layer and was also flush with the end of the plate not bearing the double-coated adhesive tape. The construction thus prepared was rolled over twice with a rubber-coated steel roller having a weight 6.8 kg.

A 1 mm thick aluminum plate having the same size as the primed steel test plate was first wrapped with an adhesive tape liner comprising a siliconized film and then placed on top of the screen as a weight. The weighted construction was placed in a forced air oven horizontally on a rack for 45 minutes at 160° C. The test samples were removed from the oven, allowed to cool and then conditioned for 24 hours at 50% relative humidity and 23° C. before measurements were made.

The 90 degree peel test method described above was then applied to the thermoset adhesive layers comprising the embedded screen. The portion of the screen extending beyond the bonded area was grasped in the jaws of the tensile tester and pulled apart at 90° at a rate of 300 mm / minute. The test results were recorded in N/1.27 cm. The method of failure was also recorded as adhesive or cohesive failure.

Coefficient of Expansion in the Z-Direction

A glass plate having the dimensions of 2.7 cm×4.6 cm×1 mm was cleaned with methyl ethyl ketone and dried.

A 1.27 cm×1.27 cm×1 mm layer or film of the thermosettable adhesive was laid in approximately the center of the glass plate. The thermosettable adhesive layer was then covered with a thin cover glass commonly used for microscopic examination. The sample between the two layers of glass was thermoset for 45 minutes at 160° C.

The thermoset adhesive layer between the layers of glass was then placed on the heated stage of a light microscope and heated from 30° C. to 180° at a rate of 4° C. per minute and then cooled to room temperature. The microspcope objective was focused on the surface of the cover glass at two points during the temperature cycle: 1) before heating, and 2) at 180°. The deviation of the z-axis of the sample (height) was measured in microns. The expansion of the glass plates and heating table in the z-direction was measured independently in the absence of the thermoset adhesive layer and was subtracted from the total expansion measured when the sealing tape was present.

The coefficient of expansion c was calculated as $$c=(B/\Delta T-D)/E$$

wherein B is the height deviation (in $\mu$m), $\Delta T$ is the temperature difference (in K), D is the expansion of the glass plates and heating table in the z-direction as measured independently in the absence of the thermoset adhesive layer (in $\mu$m), and E is the tape thickness (in mm). The coefficient of expansion c is given in $\mu$m mm$^{-1}$ K$^{-1}$.

Durability Test

A steel coupon having the dimensions of 5 cm×12 cm bearing the ED 5100 primer referred to above, was cleaned with methyl ethyl ketone and dried.

A strip of a layer or film of a thermosettable adhesive measuring 10 cm×1.27 cm×1 mm was applied to the single primed, steel coupon and pressed on lightly by hand. The surface of the steel plate bearing the thermosettable adhesive layer was then painted by applying 1) a primer paint available as E 730 G 311 commercially available from Peugot/Citroen with a spray gun. The primer was dried for 5 minutes at ambient conditions and then for 20 min at 140° C.;
2) a color base coat 337.1.315 EA commercially available from Peugot/Citroen with a spray gun. The base coat was then dried 5 min at ambient conditions;
3) a clear coat R 701 I 404 commercially available from Peugot/Citroen with a spray gun. The clear coat was then dried at ambient conditions for 5 min, followed by drying in a forced air oven for 25 min at 140° C.

The painted test panels bearing the thermoset, painted adhesive layer were then exposed to a three part temperature cycle comprising:
1) 16 hrs at 40° C. and 95% humidity,
2) 3 hrs at −20° C. and
3) 6 hrs at 85° C.

The cycle was repeated 20 times.

The painted sample was then evaluated visually for cracks in the paint layer and loss of paint at the edges of the thermoset adhesive layer. The results were recorded as pass (+) or fail (−).

Overlap Shear

A modified version of ISO 4587 was used.

Two steel coupons having the dimensions of 2.54 cm×9 cm and bearing the ED 5100 primer (applied by E-coating) referred to above, was cleaned with methyl ethyl ketone and dried.

A 1 mm thick layer or film of the thermosettable adhesive which was prepared as described in the examples and allowed to age for at least 24 hours before testing, measuring 1.27 cm×2.54 cm, was adhered flush with the end of the first primed steel coupon so that the width was entirely covered with tape and the tape extended 1.27 cm along the length of the coupon. In order to maintain a constant thickness of the bond in the event that melt-flow of the thermosettable adhesive occurs during thermosetting, two pieces of stainless steel wire (0.030 inches) were placed on top of the sample, spaced at regular intervals and aligned parallel to the length of the steel coupon.

The second primed steel coupon was then placed on top of the sample in a manner so that the sample was also flush with the end of the second coupon. The non-adhered body of the second coupon did not overlap the unbonded area of the first coupon, however. The adhesive layer was sandwiched between the steel coupons in such a manner that the coupons overlapped only in the bonded area.

Pressure was applied to the bond by securing the coupon/adhesive layer/coupon sandwich from the sides using small wing-type binder clips.

The melt sealing material sample was then cured by placing the construction in a forced air oven at 160° C. for 20 minutes. The thermoset construction was then placed in a tensile tester and the jaws moved apart at 50 mm per minute.

The maximum force was recorded in N/mm$^2$. The test was repeated four times and the results averaged.

This test gives an indication of the toughness and strength of the adhesive bond after it has been thermoset.

Elongation at Break

A standard tensile strength procedure was conducted on a 1 mm thick layer or film of the thermosettable adhesive according to ISO 1184 D 638. A layer of the thermosettable adhesive was prepared as described in the examples and then thermoset in a forced air oven at 160° C. for 20 min. The sample was allowed to cool and then aged for at least 24 hours before testing.

This test gives an indication of the strength of the thermoset adhesive layer.

EXAMPLES 1–7 and

Comparative Examples C1–C2

A strip of a tacky thermosettable adhesive layer for patch and seam sealing applications was prepared by the following procedure.

N-vinyl caprolactam monomer was melted in a ventilated forced-air oven and dissolved in n-butylacrylate monomer (solution A). When hyroxyphenoxypropylacrylate was present, it was added to the n-butyl acrylate and N-vinylcaprolactam monomers as part of solution A.

The epoxy compounds, polyvinylacetate, core-shell polymers and aluminum trihydroxide were then mixed into solution A.

Photoinitiator for the photopolymerization of the acrylate component was then added as well as the heat-activatable curing system for the epoxy component (comprising a heat-activatable hardener and an accelerator) and the antioxidant. The resulting formulation was mixed at high shear for 10 min at 1,500 rpm.

The chemical composition of the materials used in Examples 1–7 and in Comparative Examples C1–C2 is shown in Table 1.

The viscous mixture obtained was degassed and coated onto a transparent adhesive-repellent release liner (silicone-coated polyethylene terephthalate film) with a knife coater at a thickness of 1 mm for test purposes. A second transparent release liner (silicone-coated polyethylene terephthalate film) was laminated on top of the coating. The polymeric layer between the two transparent release liners was then polymerized using radiant energy of medium pressure mercury lamps applied through each of the transparent release liners.

The total energy utilized in the polymerization step: 380 mJ/cm$^2$ through both top and bottom release liners effecting a total radiation energy of 760 mJ/sq.cm. Physical properties of the precursor of the thermosettable adhesive, of the thermosettable adhesive and of the thermoset adhesive, respectively, as measured according to the test methods described above, are summarized in table 2.

| Example | 1 | 2 | 3 | 4 | 5 | 6 | 7 | C1 | C2 |
|---|---|---|---|---|---|---|---|---|---|
| n-Butyl acrylate | 34.13 | 33.66 | 34.61 | 33.21 | 32.76 | 31.51 | 33.66 | 35.10 | 36.13 |
| N-vinyl caprolactam | 7.49 | 7.39 | 7.60 | 7.30 | 7.20 | 6.91 | 7.39 | 7.71 | 7.93 |
| Hydroxy PhPA | 2.77 | 2.74 | 0 | 2.70 | 2.66 | 2.56 | 4.10 | 2.85 | 0 |
| D.E.R. 331 | 24.14 | 23.81 | 24.48 | 23.49 | 23.17 | 22.28 | 23.81 | 24.83 | 25.56 |
| D.E.R. 671 | 9.57 | 9.44 | 9.70 | 9.30 | 9.19 | 8.83 | 9.44 | 9.84 | 10.13 |
| UW-1 | 9.58 | 9.45 | 9.71 | 9.31 | 9.20 | 8.84 | 9.45 | 9.85 | 10.14 |
| 445006 | 7.08 | 6.98 | 7.17 | 6.88 | 6.79 | 6.53 | 6.98 | 7.27 | 7.50 |
| Aluminum trihydroxide | 2.77 | 4.10 | 4.22 | 5.40 | 6.66 | 10.25 | 2.74 | 0 | 0 |
| Irgacure 651 | 0.10 | 0.10 | 0.11 | 0.10 | 0.10 | 0.10 | 0.10 | 0.11 | 0.11 |
| Irganox 1010 | 0.04 | 0.04 | 0.04 | 0.04 | 0.04 | 0.04 | 0.04 | 0.04 | 0.04 |
| DICY | 1.79 | 1.76 | 1.81 | 1.74 | 1.71 | 1.65 | 1.76 | 1.84 | 1.89 |
| 2MZ-A-S | 0.54 | 0.53 | 0.55 | 0.53 | 0.52 | 0.50 | 0.53 | 0.56 | 0.57 |

| | |
|---|---|
| UW-1 | Polyvinylacetate, softening point 107–112° molecular weight 150,000 (commercially available as Vinnapas UW-1 from Wacker Chemie, Munich) |
| HydroxyPh PA | Hydroxyphenoxypropylacrylate commercially available as CN 131 from Cray Valley Comp., France |
| 445006 | Core/shell polymer, silicone core with polymethylmethacrylate shell, particle size <30 micron, Tg (two transitions) −110° C. and 120° C. (commercially available as Modifier 445006 from Wacker Chemie, Munich) |
| D.E.R: 331 | Bisphenol A based epoxy resin, epoxy eq. wt. ca. 185, liquid at room temperature (commercially available as DER 331 from Dow Chemical) |
| D.E.R. 671 | Bisphenol A based epoxy resin, epoxy eq. wt. ca. 500, solid at room temperature (commercially available as DER 671 from Dow Chemical) |
| Aluminum trihydroxide - | Spaccrite S 11 commercially available from Alcoa Inc., USA. |
| Irgacure 651 | Photoinitiator, commercially available as Irgacure ™ 651 from Ciba-Geigy, Switzerland |
| Irganox 1010 | Antioxidant, commercially available as Irganox 1010 from Ciba-Geigy |
| DICY | Dicyandiamide epoxy hardener (commercially available as Amicure CG 1200 from Air Products) |
| 2MZ-A-S | Iimidazole derivative epoxy accelerator, commercially available as Curezol 2MZ-azine from Air Products |

| Example No. | 1 | 2 | 3 | 4 | 5 | 6 | 7 | C1 | C2 |
|---|---|---|---|---|---|---|---|---|---|
| | NOT PHOTOPOLYMERIZED, NOT THERMOSET | | | | | | | | |
| Viscosity (cps) | 1440 | 1600 | 1660 | 1660 | 1750 | 2000 | 1450 | 1300 | 1440 |
| | PHOTOPOLYMERIZED, NOT THERMOSET | | | | | | | | |
| 90° Peel adhesion (N/1.27 cm) | 30 | 28 | 13 | 26 | 27 | 28 | 31 | 40 | 29 |
| Melt flow (%) | 0 | 0 | 0 | 0 | 0 | 0 | 0 | 0 | 12 |
| Scaling test (+/−) | + | + | + | + | + | − | − | + | + |
| Tensile strength (N/mm$^2$) | 1.2 | 1.1 | 0.9 | 1.2 | 1.2 | 0.7 | 1.4 | 1.2 | 0.9 |
| Overlap Shear (N/mm$^2$) | 0.82 | 0.81 | 0.52 | 0.71 | 0.83 | 0.43 | 0.99 | 0.79 | 0.49 |

-continued

| Example No. | 1 | 2 | 3 | 4 | 5 | 6 | 7 | C1 | C2 |
|---|---|---|---|---|---|---|---|---|---|
| PHOTOPOLYMERIZED AND THERMOSET | | | | | | | | | |
| 90° Peel adhesion (embedded screen) (N/1.27 cm) | 34 | 40 | 37 | 47 | 58 | 70 | 52 | 27 | 21 |
| Coef. of exp. (Z) ($\mu$m mm$^{-1}$ K$^{-1}$) | 0.57 | 0.6 | — | — | 0.8 | 1.1 | — | 0.56 | 0.8 |
| Durability (+/−) | − | − | − | + | + | + | + | − | − |
| Overlap Shear (N/mm$^2$) | 5.4 | 5.0 | 2.4 | 4.5 | 4.4 | 2.0 | 5.0 | 4.7 | 2.1 |
| Elongation at break (%) | 58 | 38 | 15 | 112 | 109 | 69 | 156 | 12 | 4 |

What is claimed is:

1. Thermosettable adhesive comprising a thermosettable polymer component, a thermoformable polymer component, an effective amount of heat-activatable or photoactivatable curing system or combinations thereof for curing the thermosettable polymer component, and from 0.5–20 wt. % of one or more compounds selected from hydroxides of Al, Mg and Zr; hydroxyoxides of Al, Mg and Zr; or combinations thereof, wherein all weight percentages are based on a total weight of the thermosettable adhesive.

2. Thermosettable adhesive according to claim 1, wherein the adhesive is a pressure-sensitive adhesive.

3. Thermosettable adhesive according to claim 1, wherein the thermoformable polymer component comprises one or more polyacrylates, polyesters, or combinations thereof.

4. Thermosettable adhesive according to claim 1, wherein the thermosettable polymer component comprises one or more compounds selected from epoxy monomers, epoxy oligomers, epoxy resins, or combinations thereof.

5. Thermosettable adhesive according to claim 1, wherein the adhesive is a reaction product formed by photopolymerization of an adhesive precursor comprising:
   (i) from about 25 to 60 wt. % of a photopolymerizable, optionally partly prepolymerized mixture comprising at least one acrylic acid ester of a non-tertiary alcohol, and at least one reinforcing, copolymerizable monomer;
   (ii) from about 8 to 60 wt. % of one or more compounds selected from epoxy monomers, epoxy oligomers, epoxy resins, or combinations thereof, wherein the one or more compounds contain no photopolymerizable groups;
   (iii) from 0 to 15 wt. % of one or more additional thermoformable polymers selected from polyvinylacetate, poly(ethylene vinyl acetate), polyacetals, polyesters, poly(caprolactones), or combinations thereof;
   (iv) from about 0.1 to 10 wt. % of a heat-activatable curing system for the epoxy component (ii);
   (v) from about 0.005 to 3 wt. % of a photoinitiator for the acrylate components (i); and
   (vi) from about 0.1 to 20 wt. % of one or more compounds selected from hydroxides of Al, Mg and Zr; hydroxyoxides of Al, Mg and Zr; or combinations thereof;
   wherein all weight percentages are based on the total weight of the thermosettable adhesive.

6. Thermosettable adhesive according to claim 5, wherein the acrylate component (i) further comprises at least one hydroxy-substituted acrylic ester of a non-tertiary alcohol in addition to the at least one acrylic ester of a non-tertiary alcohol.

7. Thermosettable adhesive according to claim 1 formed by extrusion of a mixture comprising:
   (i) from about 2 to 80 wt. % of one or more polyesters;
   (ii) from about 5 to 80 wt. % of one or more compounds selected from epoxy monomers, epoxy oligomers, epoxy resins, or combinations thereof;
   (iii) from 0 to 15 wt. % of one or more additional thermoformable polymers selected from polyacrylate, polyvinylacetate, poly(ethylene vinyl acetate), polyacetals, poly(caprolactones), or combinations thereof;
   (iv) an effective amount of one or more heat-activatable or one or more photoactivatable curing systems, or combinations thereof, for the epoxy component (ii); and
   (v) from about 0.1 to 20 wt. % of one or more compounds selected from hydroxides of Al, Mg and Zr; hydroxyoxides of Al, Mg and Zr; or combinations thereof,
   wherein an onset temperature of a curing reaction of the epoxy component (ii) is higher than an extrusion temperature and wherein all weight percentages are based on the total weight of the thermosettable adhesive.

8. Thermosettable adhesive tape comprising at least one layer of a thermosettable adhesive according to claim 1, wherein such layer has at least one exposed surface and optionally comprises a backing.

9. Thermosettable adhesive according to claim 1, wherein the adhesive is utilized for melt sealing or bonding applications.

10. A thermosettable adhesive comprising:
   (i) a thermosettable polymer selected from the group consisting of epoxy resins, epoxy monomers, and epoxy oligomers;
   (ii) a thermoformable polymer selected from polyacrylate homopolymers and copolymers;
   (iii) an effective amount of a curing agent for the thermosettable polymer; and
   (iv) 0.1 to 20 weight percent of one or more compounds selected from the group consisting of aluminum hydroxides and aluminum hydroxyoxides, based on a total weight of the thermosettable adhesive.

11. Thermosettable adhesive according to claim 1, wherein the one or more compounds comprise hydroxides of Al; hydroxyoxides of Al; or combinations thereof.

12. Thermosettable adhesive according to claim 1, wherein the one or more compounds comprise hydroxyoxides of Al, Mg and Zr.

13. Thermosettable adhesive according to claim 1, wherein the one or more compounds are present at a weight percent of at least 2.5 wt % based on the total weight of the thermosettable adhesive.

14. Thermosettable adhesive according to claim 1, wherein the at least one reinforcing, copolymerizable monomer comprises isobornyl acrylate, N-vinyl pyrrolidone, N-vinyl caprolactam, N-vinyl piperidine, N,N-dimethylacrylamide, acrylonitrile, or combinations thereof.

15. Thermosettable adhesive according to claim 10, wherein the one or more compounds are present at a weight percent of at least 2.5 wt % based on the total weight of the thermosettable adhesive.

16. Thermosettable adhesive according to claim 10, wherein the one or more compounds comprise aluminum hydroxyoxides.

17. A thermosettable adhesive comprising a reaction product formed by photopolymerization of an adhesive precursor comprising:
  (i) from about 25 to 60 wt. % of a photopolymerizable, optionally partly prepolymerized mixture comprising at least one acrylic acid ester of a non-tertiary alcohol, and at least one reinforcing, copolymerizable monomer;
  (ii) from about 8 to 60 wt. % of one or more first compounds selected from epoxy monomers, epoxy oligomers, epoxy resins, or combinations thereof, wherein the one or more first compounds contain no photopolymerizable groups;
  (iii) from 0 to 15 wt. % of one or more additional thermoformable polymers selected from polyvinylacetate, poly(ethylene vinyl acetate), polyacetals, polyesters, poly(caprolactones), or combinations thereof;
  (iv) from about 0.1 to 10 wt. % of a heat-activatable curing system for the epoxy component (ii);
  (v) from about 0.005 to 3 wt. % of a photoinitiator for the acrylate components (i); and
  (vi) from about 0.1 to 20 wt. % of one or more second compounds selected from hydroxides of Al; hydroxyoxides of Al; or combinations thereof;
  wherein all weight percentages are based on the total weight of the thermosettable adhesive.

18. The thermosettable adhesive according to claim 17, wherein the one or more second compounds comprise aluminum hydroxyoxides.

19. The thermosettable adhesive according to claim 17, wherein the one or more second compounds are present at a weight percent of at least 2.5 wt % based on the total weight of the thermosettable adhesive.

20. The thermosettable adhesive according to claim 17, wherein the at least one reinforcing, copolymerizable monomer comprises isobornyl acrylate, N-vinyl pyrrolidone, N-vinyl caprolactam, N-vinyl piperidine, N,N-dimethylacrylamide, acrylonitrile, or combinations thereof.

* * * * *

UNITED STATES PATENT AND TRADEMARK OFFICE
CERTIFICATE OF CORRECTION

PATENT NO. : 6,350,791 B1  
APPLICATION NO. : 09/582512  
DATED : February 26, 2002  
INVENTOR(S) : Georg Feichtmeier and Peggy S. Willett It is certified that error appears in the above-identified patent and that said Letters Patent is hereby corrected as shown below:

Title page,
Item (56), References Cited, under U.S. PATENT DOCUMENTS, please add:

| | | |
|---|---|---|
| --3,708,296 | 1/1973 | Schlesinger |
| 3,729,313 | 4/1973 | Smith |
| 3,741,769 | 6/1973 | Smith |
| 3,794,576 | 2/1974 | Watt |
| 3,808,006 | 4/1974 | Smith |
| 4,026,705 | 5/1977 | Crivello et al. |
| 4,058,401 | 11/1977 | Crivello |
| 4,069,054 | 1/1978 | Smith |
| 4,069,055 | 1/1978 | Crivello |
| 4,101,513 | 7/1978 | Fox et al. |
| 4,216,288 | 8/1980 | Crivello |
| 4,231,951 | 11/1980 | Smith et al. |
| 4,250,203 | 2/1981 | Schlesinger et al. |
| 4,394,403 | 7/1983 | Smith |
| 4,623,676 | 11/1986 | Kistner |
| 4,645,805 | 2/1987 | Gaku et al. |
| 4,778,253 | 10/1988 | Siga et al. |
| 5,059,701 | 10/1991 | Keipert |
| 5,077,870 | 1/1992 | Melbye et al. |
| 5,089,536 | 2/1992 | Palazzotto |
| 5,091,608 | 2/1992 | John |
| 5,436,063 | 7/1995 | Follett et al.-- |

Item (56), References Cited, under FOREIGN PATENT DOCUMENTS, please add:

| | | |
|---|---|---|
| --EP | 0 109 851 | 9/1993 |
| EP | 0 620 259 | 10/1994 |
| JP | 03 167283 | 7/1991 |
| WO | 94/21741 | 9/1994 |
| WO | 95/13315 | |
| WO | 95/13327 | |
| WO | 95/13328 | |
| WO | 96/32453 | |
| WO | 98/12021-- | |

UNITED STATES PATENT AND TRADEMARK OFFICE
CERTIFICATE OF CORRECTION

PATENT NO.         : 6,350,791 B1
APPLICATION NO. : 09/582512
DATED                  : February 26, 2002
INVENTOR(S)        : Georg Feichtmeier and Peggy S. Willett It is certified that error appears in the above-identified patent and that said Letters Patent is hereby corrected as shown below:

Item (56), References Cited, under OTHER PUBLICATIONS, please add:
-- "Encyclopedia of Polymer Science & Engineering", Wiley, New York 1988, vol. 14, p. 769.
N.R. Dando, P.L. Kolek, E.S. Martin and T.R. Clever, "Performance Optimization of 100% Solids, UV-Cure Inks and Wood Fillers Using Aluminum Trihydroxide (ATH) Filler", Journal of Coatings Technology, August 1996, Vol. 68, No. 859, pp. 67-72.
Anthony A. Parker, E.S. Martin and T.R. Clever, "Aluminum Trihydroxide (ATH): A UV Transparent Filler for UV-Curable Coatings", Journal of Coatings Technology, February 1994, Vol. 66, No. 829, pp. 39-46.
N.R. Dando, T.R. Clever, E.S. Martin and Paula Kolek, "Aluminum Trihydroxide Filler for UV Curable Polymers", Modern Paint and Coatings, August 1995, pp. 29, 40, 42-44, 48.--

Column 4,
Line 45, delete "comprised" and insert in place thereof --comprises--.

Column 6,
Lines 33-34, delete "H üls" and insert in place thereof --Hüls--.

Column 9,
Line 2, delete "In.29" and insert in place thereof --ln. 29--.
Line 20, delete "and,,optionally," and insert in place thereof --and, optionally,--.

Column 12,
Line 55, delete "In. 19-p.9, In.47." and insert in place thereof --ln. 19- p.9, ln. 47 --.

Column 14,
Line 63, delete "50-00" and insert in place thereof --50-500--.

UNITED STATES PATENT AND TRADEMARK OFFICE
CERTIFICATE OF CORRECTION

PATENT NO. : 6,350,791 B1
APPLICATION NO. : 09/582512
DATED : February 26, 2002
INVENTOR(S) : Georg Feichtmeier and Peggy S. Willett It is certified that error appears in the above-identified patent and that said Letters Patent is hereby corrected as shown below:

Column 15,
Line 64, delete "fill" and insert in place thereof --full--.

Signed and Sealed this

Ninth Day of October, 2007

JON W. DUDAS
*Director of the United States Patent and Trademark Office*